United States Patent [19]

Trimble et al.

[11] Patent Number: 5,708,440
[45] Date of Patent: Jan. 13, 1998

[54] PSEUDOLITE TRANSLATOR FOR UNLICENSED FREQUENCIES

[75] Inventors: Charles R. Trimble, Los Altos Hills; Arthur N. Woo, Cupertino, both of Calif.

[73] Assignee: Trimble Navigation Limited, Sunnyvale, Calif.

[21] Appl. No.: 659,747

[22] Filed: Jun. 6, 1996

Related U.S. Application Data

[63] Continuation-in-part of Ser. No. 453,261, May 30, 1995.
[51] Int. Cl.$^6$ .................. H04B 7/185; G01S 5/02
[52] U.S. Cl. ............................................. 342/357
[58] Field of Search .................. 342/357; 364/449.7

[56] References Cited

U.S. PATENT DOCUMENTS

| | | | |
|---|---|---|---|
| 5,440,491 | 8/1995 | Kawano et al. | 364/443 |
| 5,512,902 | 4/1996 | Guthrie et al. | 342/357 |
| 5,572,218 | 11/1996 | Cohen et al. | 342/357 |
| 5,583,513 | 12/1996 | Cohen | 342/357 |

*Primary Examiner*—Theodore M. Blum
*Attorney, Agent, or Firm*—Wagner, Murabito & Hao

[57] ABSTRACT

A pseudolite translator apparatus and method for using a pseudolite translator. In one embodiment, a pseudolite translator includes a receiver which is adapted to receive position information having a first frequency. The position information is transmitted from a pseudolite. In the present embodiment, the first frequency at which the position information is transmitted from the pseudolite is an unlicensed frequency. A frequency converting processor of the translator converts the position information having the first unlicensed frequency to position information having a second frequency. The translator also contains an output unit which is coupled to the frequency converting processor. The output unit is adapted to communicate the position information having the second frequency to a position determining device.

7 Claims, 9 Drawing Sheets

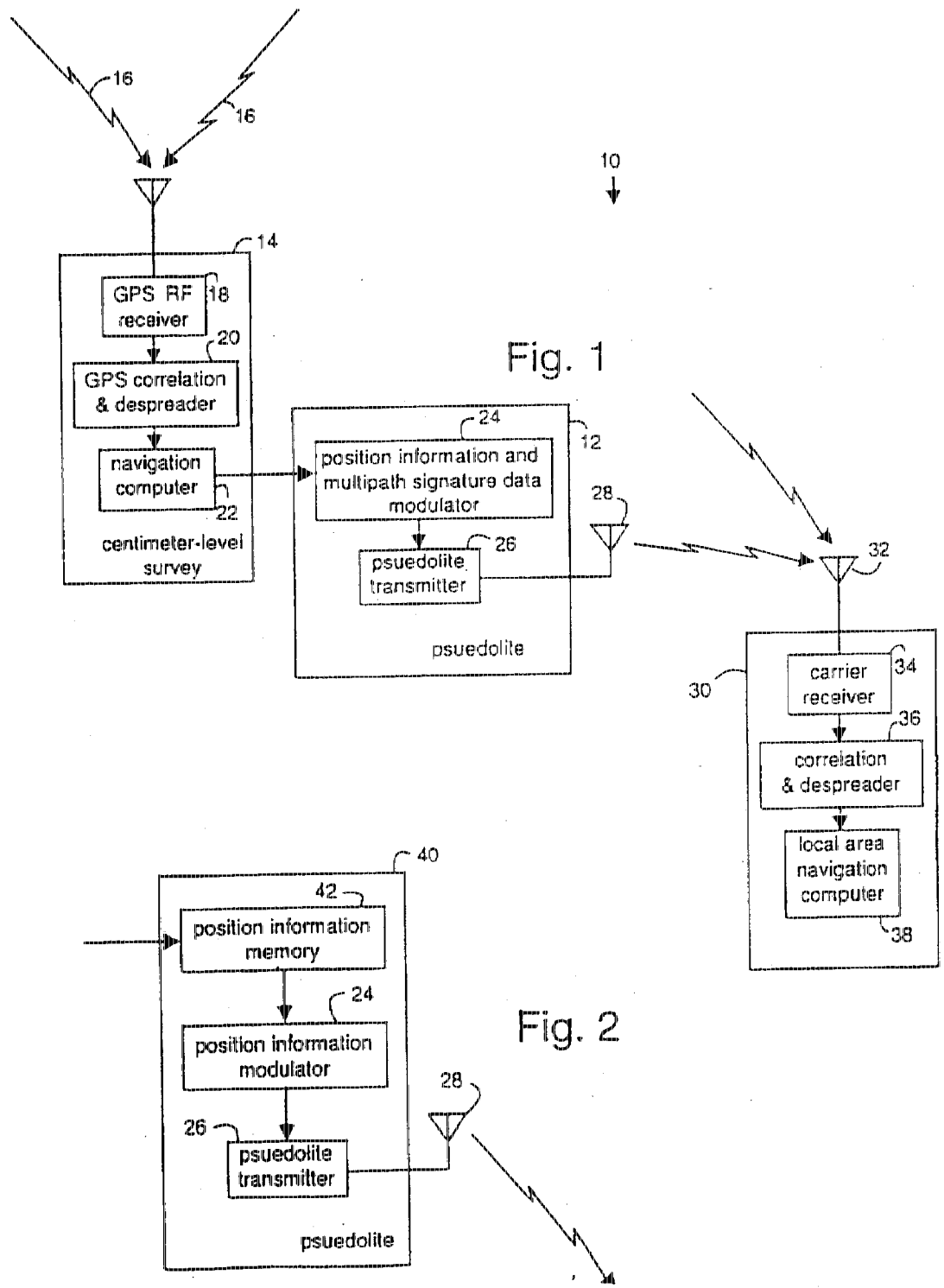

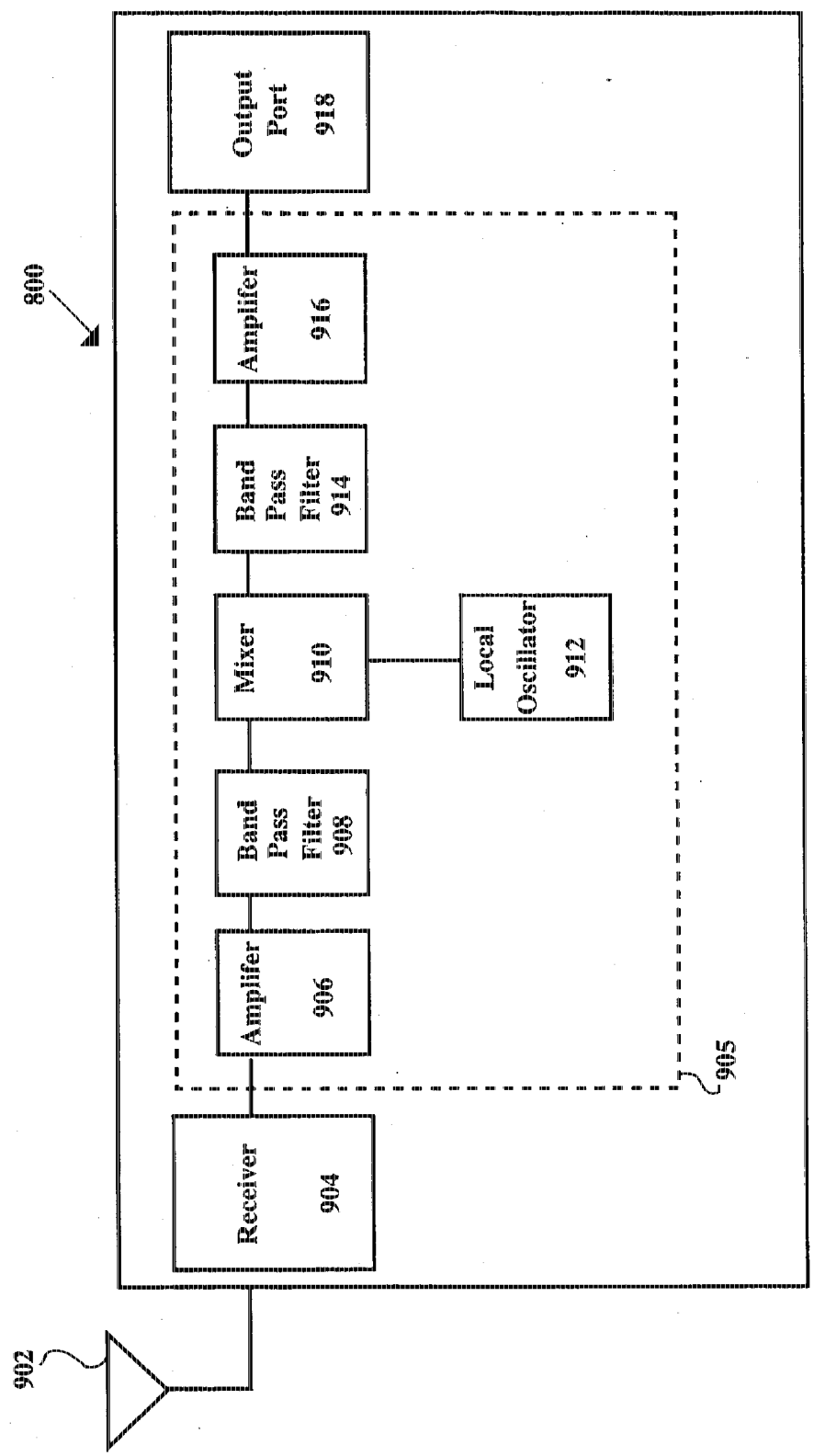

PSEUDOLITE TRANSLATOR FOR UNLICENSED FREQUENCIES

This Application is a continuation-in-part of co-pending U.S. patent application Ser. No. 08/453,261 to Trimble et al. entitled "Local-Area Navigation System with Fixed Pseudolite Reference Transmitters." The copending Application was filed May 30, 1995.

TECHNICAL FIELD

The present invention relates generally to navigation systems and more specifically to navigation receivers that operate with signals received from fixed-location pseudolites.

BACKGROUND ART

The global positioning system operated by the United States government uses microwave transmissions from orbiting satellites with known orbits. The transmissions are received by a satellite navigation receiver to determine the position of the receiver by triangulation. Such microwave frequencies are easily blocked by tree cover, building roofs or various other obstructions. Locating the receiver in a canyon or valley can also limit performance by excluding necessary satellites from a constellation being tracked.

As result, some prior art GPS applications use pseudolites to augment the satellite constellation. Such pseudolites mimic the satellite transmissions, but are fixed on the ground and transmit the appropriate ephemeris data, e.g., in a "high-observable six" configuration where the four orbiting satellites being tracked are augmented by two additional "satellites". The signal reception is guaranteed since the pseudolites are located near the place where the receiver is used, and their ephemeris data is highly accurate because their transmitting positions are accurately surveyed-in. For example, a pair of pseudolites at the end of an airport's runway are conventionally used to enhance the position determination of a receiver located on board a landing airplane.

Centimeter-accurate, real-time kinematic GPS receivers are now available to make it possible to operate robotic and other control systems in confined areas, e.g., a construction yard or site. However, the operation of such receivers within a building is not possible with conventional units because the satellites' signals are blocked by the building and are subject to deliberate errors that can be randomly injected during "Selective Availability" (SA) periods.

As yet another disadvantage, prior art pseudolite systems require the user to modify or adapt a conventional GPS receiver. That is, prior art systems require that the GPS receiver be modified to accommodate, i.e., receive position information transmitted at a particular frequency used by the pseudolite. Furthermore, different pseudolites may transmit position information at different respective frequencies. Thus, each pseudolite may be able to communicate only with certain GPS receivers which have been modified or augmented to receive that pseudolite's particular frequency.

DISCLOSURE OF THE INVENTION

In one embodiment, the present invention provides a system of receivers and pseudolites in a localized area for navigating equipment relative to the area especially while inside a building or outside in an area obstructed from a direct line-of-sight with the GPS satellites.

In another embodiment, the present invention provides a pseudolite with automatic updates of its own surveyed position.

In still another embodiment, the present invention provides a system of receivers and pseudolites within a localized area for navigating equipment relative to the area especially while in the interiors or decks of large vessels.

In yet another embodiment, the present invention provides a navigation receiver that provides high quality measurements on signals from both navigation satellites and fixed-location pseudolites which use separate carrier frequencies.

The present invention further provides a pseudolite translator apparatus and method for using a pseudolite translator. In the present embodiment, a pseudolite translator includes a receiver which is adapted to receive position information having a first frequency. The position information is transmitted from a pseudolite. A frequency converting processor of the translator converts the position information having the first frequency to position information having a second frequency. The translator also contains an output unit which is coupled to the frequency converting processor. The output unit is adapted to communicate the position information having the second frequency to a position determining device such as a conventional GPS receiver.

In another embodiment, the first frequency of the position information is an unlicensed frequency selected from the group of frequencies consisting of 902–928 MHz, 2400–2483.5 MHz, 5725–5875 MHz, and 24.0–24.5 GHz.

In still another embodiment, the second frequency of the position information is 1575.42 or 1227.6 MHz.

The advantages of the present invention will no doubt become obvious to those of ordinary skill in the art after having read the following detailed description of the preferred embodiment which is illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a block diagram of a local-area pseudolite navigation system embodiment in accordance with the present claimed invention.

FIG. 2 is a block diagram of a pseudolite with a memory to store position coordinate information in accordance with the present claimed invention.

FIG. 9 is a schematic diagram of the components contained within the translator of FIG. 8 in accordance with the present claimed invention.

BEST MODE FOR CARRYING OUT THE INVENTION

Figure 3:
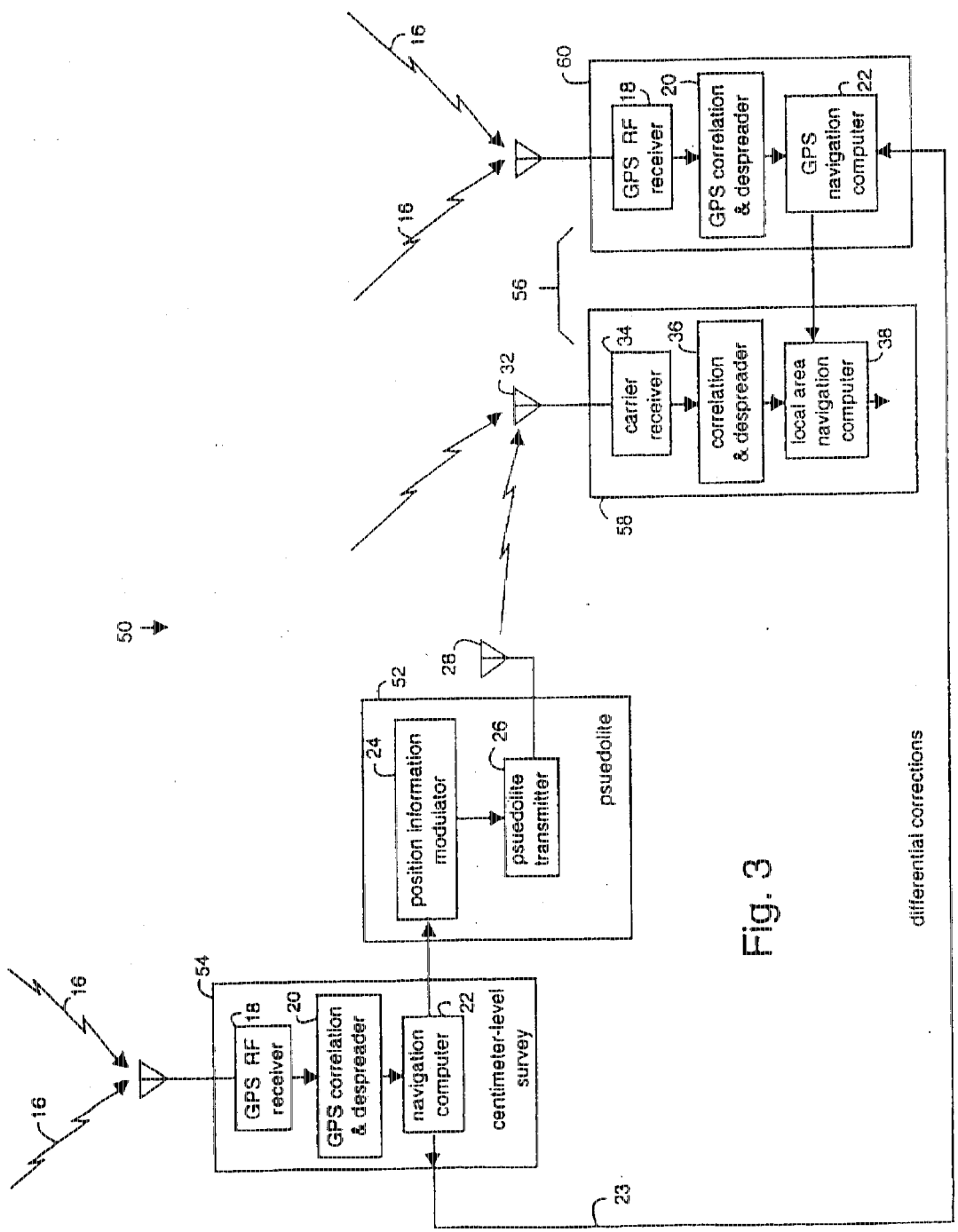
FIG. 3 is a block diagram of hybrid GPS and local-area pseudolite navigation system embodiment in accordance with the present claimed invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

FIG. 1 illustrate a local-area pseudolite navigation system embodiment of the present invention, referred to by the general reference numeral 10. The system 10 comprises a pseudolite 12 that receives periodic position determinations from a conventional centimeter level survey unit 14. A plurality of fixed frequency spread spectrum microwave radio signals 16 are received from orbiting global positioning system(GPS) satellites. A radio frequency stage 18 downconverts the signals for a GPS correlation and despreader 20. Ranging signals are then provided by the despreader 20 to navigation computer 22. Once the navigation computer 22 has determined the correct position of survey unit 14, it can thereafter provide differential correction information. For example, a link 23 (FIG. 3) represents a connection out by either by beacon radio transmission or cable of data that can be used by navigation satellite receivers to account for local variances in the ranging and time information provided by transmissions 16. Such techniques are conventional and well-known to artisans. The survey unit 14 may be a commercially-available GPS survey system, e.g., as marketed by Trimble Navigation of Sunnyvale, Calif.

The pseudolite 12 remains in a fixed position relative to the earth and some other predetermined reference, e.g., on a ship. A position information modulator 24 provides spread-spectrum coded information related to coordinates for the fixed position of the pseudolite 12. A transmitter 26 generates a carrier signal for output to an antenna 28 that carries the modulated position information. The pseudolite 12 emulates the function and radio transmissions of conventional GPS satellite transmitters, and provides ephemeris information reflecting the fixed position of the pseudolite.

Multipath errors can be exacerbated by operation in cavernous areas and close proximity of transmitters to receivers. The problem is described in detail and at least one implementation solution is proposed in U.S. Pat. No. 5,347,536, issued May. 13, 1994, to T. Meehan, and incorporated herein by reference. In order to reduce the impact of multi-path interference on its receivers, the pseudolite 12 preferably includes provision to generate multi-path signature data.

Preferably, the transmitter 26 operates on frequencies different than those assigned for use by the GPS satellites. It is particularly advantageous to operate the transmitter 26 at 900 MHz, 2.4 GHz and 5.7 GHz and at power levels under one watt in the United States, since such operation is exempt from government licensing. Of course, other frequencies that do require government licensing are also useful in this system. Alternatively, the transmitter 26 is operated to provide infrared or laser light beams as carriers that are directed to an intended local-area navigation receiver 30.

An antenna 32 receives the modulated carrier signals from at least four pseudolites 12 distributed in a geometry suitable for three-dimensional triangulation. Such carrier signals are down-converted by a carrier receiver 34 and correlated and despread by a stage 36. Ranging information to each pseudolite 12 and their reported positions are used by a local-area navigation computer 38 to determine the position of the local area navigation receiver 30. A commercially-available GPS receiver may be used to implement the localarea navigation receiver 30 if its radio frequency stages are modified to accept the carrier frequencies and types output by the pseudolites 12. For example, the SCOUT as marketed by Trimble Navigation of Sunnyvale, Calif. may be Multi-path errors affect the navigation receiver 30 in its ability to compute its position. The longer paths transitioned by multi-path signals cause a phase distortion in the auto correlation function that obscures the correct carrier and code phase and defeats attempts to compute position precisely and reliably. Several United States Patents describe the problem in detail and address solutions that may be used in the implementation of the navigation receiver 30. For example, U.S. Pat. Nos. 5,390,124, issued Feb. 14, 1995, to C. Kyrtsos; 5,402,450, issued Mar. 28, 1995, to G. Lennen; 5,375,059, issued Dec. 20, 1994, to C. Kyrtsos, et al.; and 5,390,125, issued Feb. 14, 1995 to J. Sennott, et al., all of which are incorporated herein by reference.

FIG. 2 shows a pseudolite 40 that operates without constant or periodic inputs of surveyed-positions. A memory 42 is programmed at least once with the coordinates of the actual or ultimate location of the pseudolite 40. Such coordinates may be earth coordinates, or floating coordinates relative to a building or a ship, for example. The modulator 24 and transmitter 26 are identical to those described for the pseudolite 12. However, it may be advantageous in hostile applications to make the transmitters 26 "frequency agile" with carrier frequency synthesizers to avoid enemy attempts to jam communication with the local area navigation receiver 30. In such an implementation, the carrier receiver 34 would be similarly frequency agile to track the skipping around of the carrier.

FIG. 3 illustrates a hybrid of GPS navigation and local area navigation. A hybrid navigation system 50 includes several pseudolites 52 and associated survey units 54 that are distributed in a local sheltered area, e.g., a garage, tunnel, building pr ship interior. A mobile receiver combination 56 comprises a local area navigation receiver 58 and a conventional GPS navigation receiver 60, e.g., the SCOUT as marketed by Trimble Navigation of Sunnyvale, Calif. As the mobile receiver combination 56 enters an area shadowed from orbiting GPS satellite transmissions, the pseudolites 52 provide all or parts of the missing elements needed in the three-dimensional triangulation computation of the position.

Alternatively, a dual-frequency receiver may be implemented to receive both the transmissions of the orbiting GPS satellites and the fixed-position pseudolites 52. Such a dual-frequency receiver implementation would eliminate the duplication of the correlator and despreaders 20 and 36 and navigation computers 22 and 38.

Figure 4:
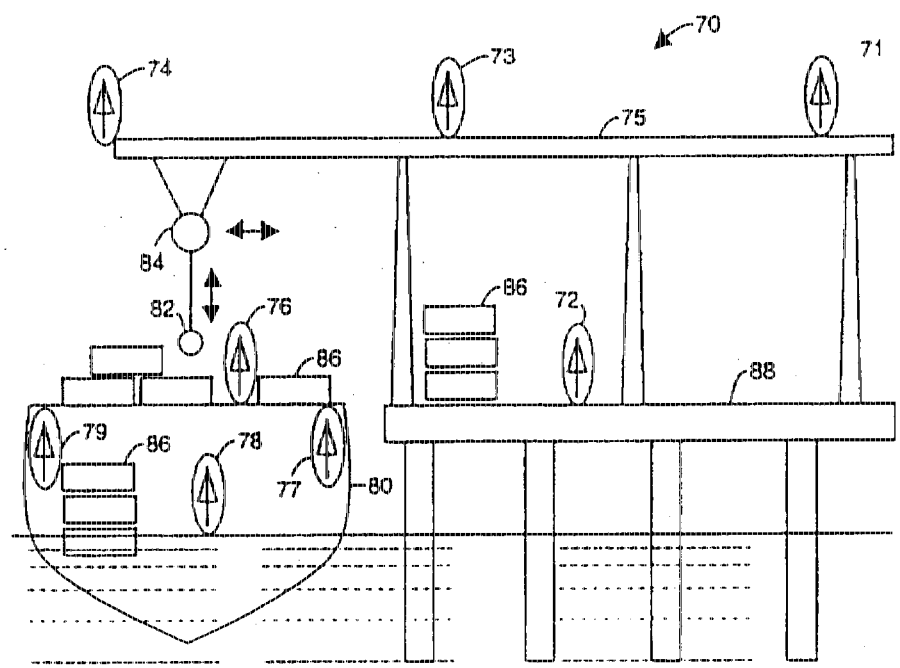
FIG. 4 is a diagram of a containerized cargo-handling system embodiment in accordance with the present claimed invention.

FIG. 4 illustrates an embodiment of the present invention for use at a shipping dock. In FIG. 4, a containerized unloading system 70 comprises a set of earth coordinate pseudolites 71–74 fixed to crane 75, and a set of floating coordinate pseudolites 76–79 fixed to a ship 80. A local area navigation receiver 82 is associated with a lift 84 that loads and unloads a number of container cargoes 86 to and from the ship 80 to a dock 88. In operation, the local area navigation receiver 82 uses transmissions from the floating coordinate pseudolites 76–79 to navigate the lift 84 about the ship 80 and the earth coordinate pseudolites 71–74 to navigate the lift 84 about the dock 88. Since the ship 80 is floating in water, its earth position can vary enough to compromise earth fixed navigation provided by the earth coordinate pseudolites 71–74. So a relative coordinate system is used that is provided by switching to receive the floating coordinate pseudolites 76–79. The pseudolites 71–74 and 76–79 are similar to pseudolites 12 or 40, FIGS. 1 and 2. The local area navigation receiver 82 is similar to the receiver 58 or the mobile receiver combination 56 of FIG. 3.

Figure 5:
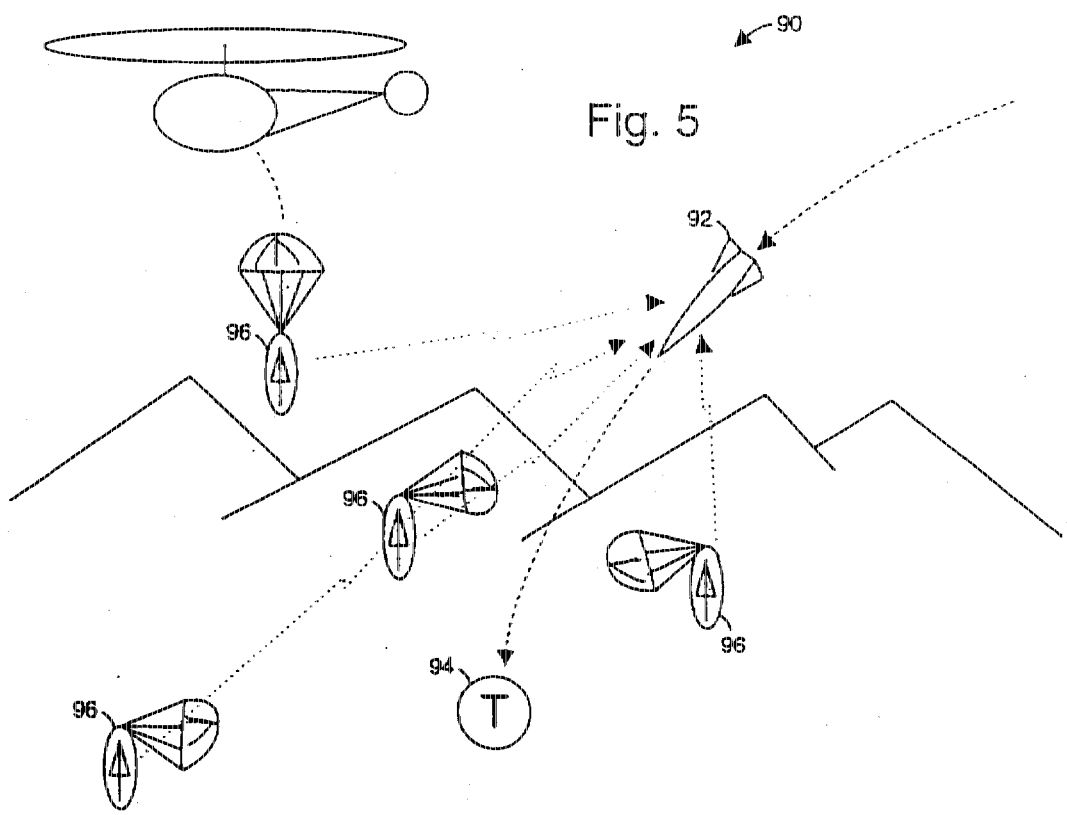
FIG. 5 is a diagram of a weapons system embodiment in accordance with the present claimed invention.

FIG. 5 illustrates an embodiment for guiding weapons to a designated area. In FIG. 5, a weapons system 90 is used to provide guidance information to a smart-weapon 92. The position of a target 94 is known to the smart weapon 92. The position of a target 94 is known to the smart-weapon 92, either in absolute earth coordinate terms or in terms relative to some reference point established by a set of parachute-deployed pseudolites 96. The pseudolites 96 are similar to pseudolites 12 or 40, FIGS. 1 and 2. The smart weapon carries a local area navigation receiver similar to receiver 58 or the mobile receiver combination 56 of FIG. 3.

Figure 6:
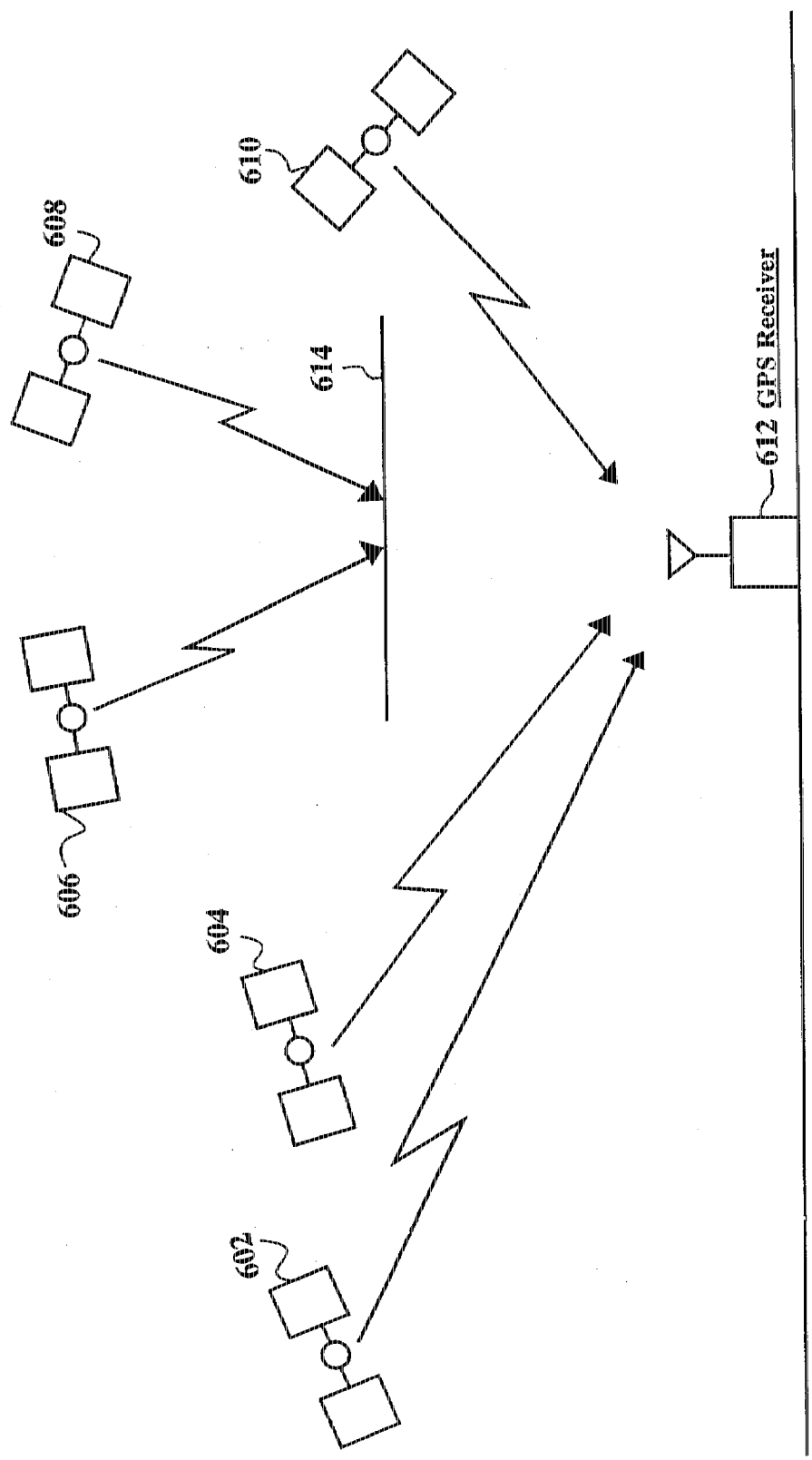
FIG. 6 is a schematic diagram illustrating an obstruction which interrupts a line of sight transmission path between a GPS receiver and GPS satellites.

With reference next to FIG. 6, a schematic diagram illustrating blocked position information signals is shown. In FIG. 6, 5 GPS satellites 602, 604, 606, 608, and 610 are located over a GPS receiver 612. As shown in FIG. 6, GPS receiver 612 is able to receive position information from GPS satellites 602, 604, and 610. However, an obstruction 614 prevents GPS receiver 612 from receiving position information signals from GPS satellites 606 and 608. That is, obstruction 614 blocks position information transmitted from GPS satellites 606 and 608 and which would have been received by GPS receiver 612. Obstruction 612 is for example, a building, a canopy of trees, a mountain, or any other structure which interrupts a line of sight transmission path between GPS receiver 612 and a GPS satellite.

Figure 7:
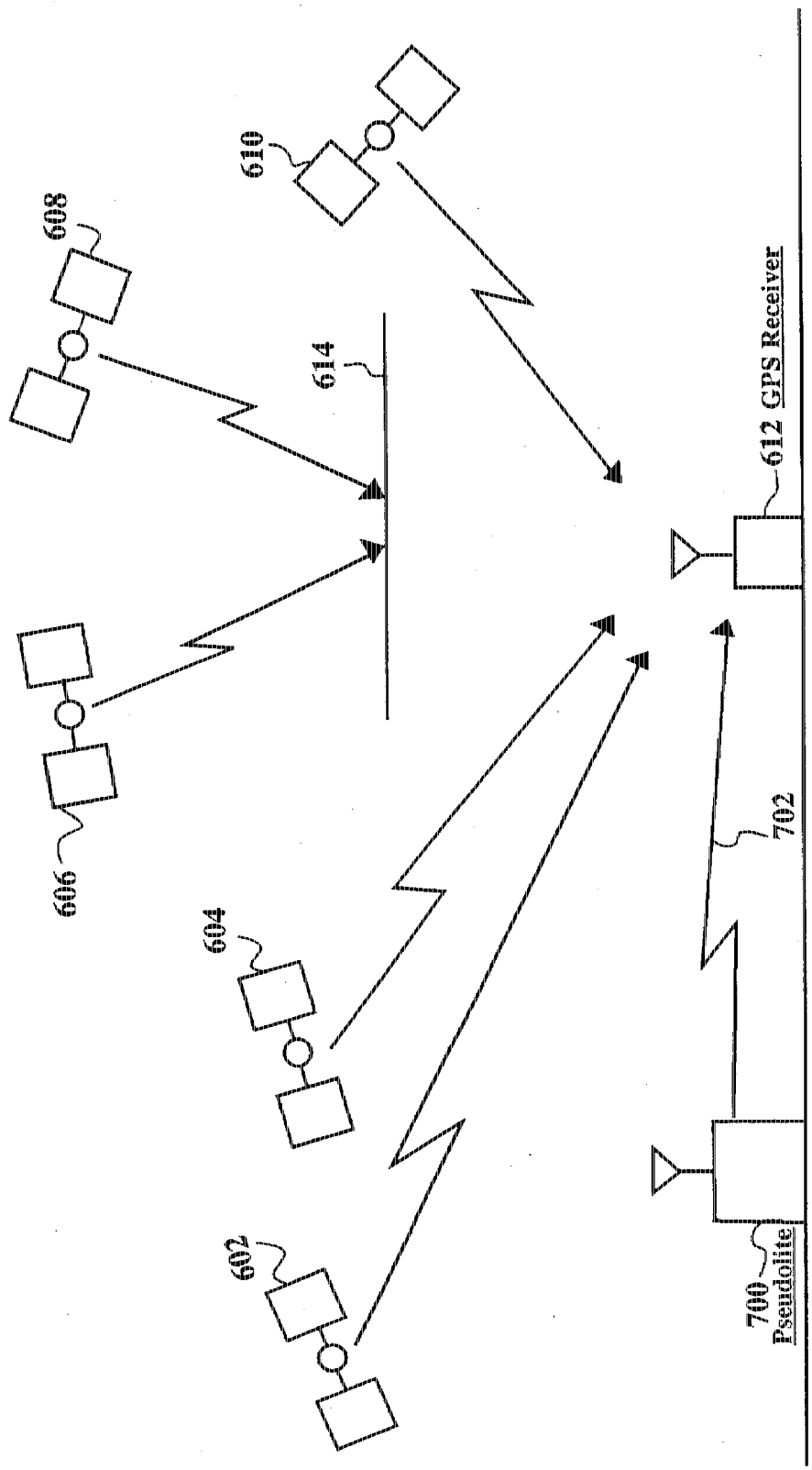
FIG. 7 is a schematic diagram illustrating the use of a pseudolite to compensate for an obstruction which interrupts a line of sight transmission path between a GPS receiver and GPS satellites.

With reference next to FIG. 7, an example of one approach used to compensate for an obstruction is shown. As described above in conjunction with previous embodiments, a pseudolite 700 transmits position information to the obstructed GPS receiver 612 over link 702 as shown. In the embodiment of FIG. 7, GPS receiver 612 must be modified to receive the position information transmitted at the particular frequency used by pseudolite 700.

Figure 8A:
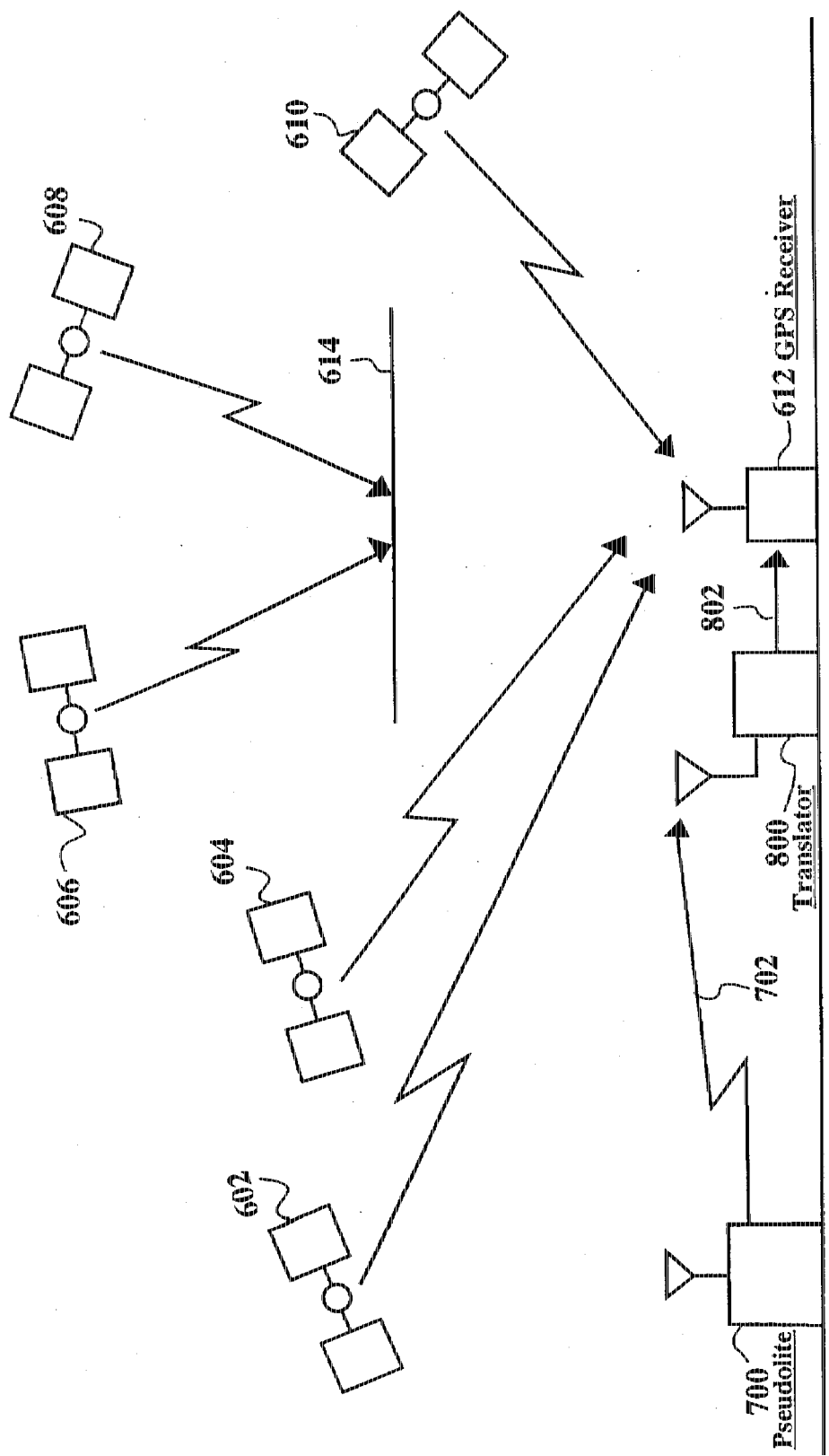
FIG. 8A is a schematic diagram illustrating the use of a translator in accordance with the present claimed invention.

Referring now to FIG. 8A, a schematic diagram illustrating the use of a translator 800 in accordance with the present claimed invention is shown. In the present embodiment, pseudolite 700 transmits position information over link 702 to translator 800. In the present embodiment, the position information is transmitted at a first frequency and a power level which is unlicensed, i.e., exempt from government licensing. In the embodiment of FIG. 8A, the position information is transmitted at a frequency selected from the group of frequencies consisting of 902–928 MHz, 2400–2483.5 MHz, 5725–5875 MHz, and 24.0–24.5 GHz at a power level of less than one watt. Although such frequencies are used in the present embodiment, the present invention is also well suited to the use of other unlicensed frequencies and other power levels available inside and outside of the United States. Furthermore, the present invention is also well suited to the use of frequencies which are not exempt from government licensing and to using power levels greater than 1 watt.

With reference still to FIG. 8A, translator 800 receives the position information signals transmitted from pseudolite 700 at a first frequency and converts the position information signals to a second frequency. The position information signals having the second frequency are then transmitted from translator 800 to GPS receiver 612 over link 802. In the present embodiment, the second frequency of the position information signals is 1575.42 MHz. As a result, GPS receiver 612 does not require any modification in order to receive and process the position information transmitted from translator 800. Thus, the present invention provides for the use of a conventional off-the-shelf GPS receiver in a pseudolite environment. Although a specific frequency of 1575.42 MHz is used in the present embodiment, the present invention is also well suited to the use of other conventional GPS position information frequencies such as 1227.6 MHz. Furthermore, the present invention is also well suited to the use of any other frequencies which a GPS receiver might be designed to receive. For example, the present invention is well suited to having the second frequency of the position information signals be 4fo. That is, the present invention is well suited to having the second frequency be four times the base frequency of 1.023 MHz. In so doing, the present invention prevents signals transmitted from translator 800 from obscuring or interfering with signals transmitted from the observable GPS satellites 602, 604, and 610. Additionally, the present invention is well suited to using a GPS receiver which is not a conventional off-the-shelf GPS receiver. For example, the present invention is well suited to using a GPS receiver which is integral with a geographic information system (GIS) attribute collecting device.

Figure 8B:
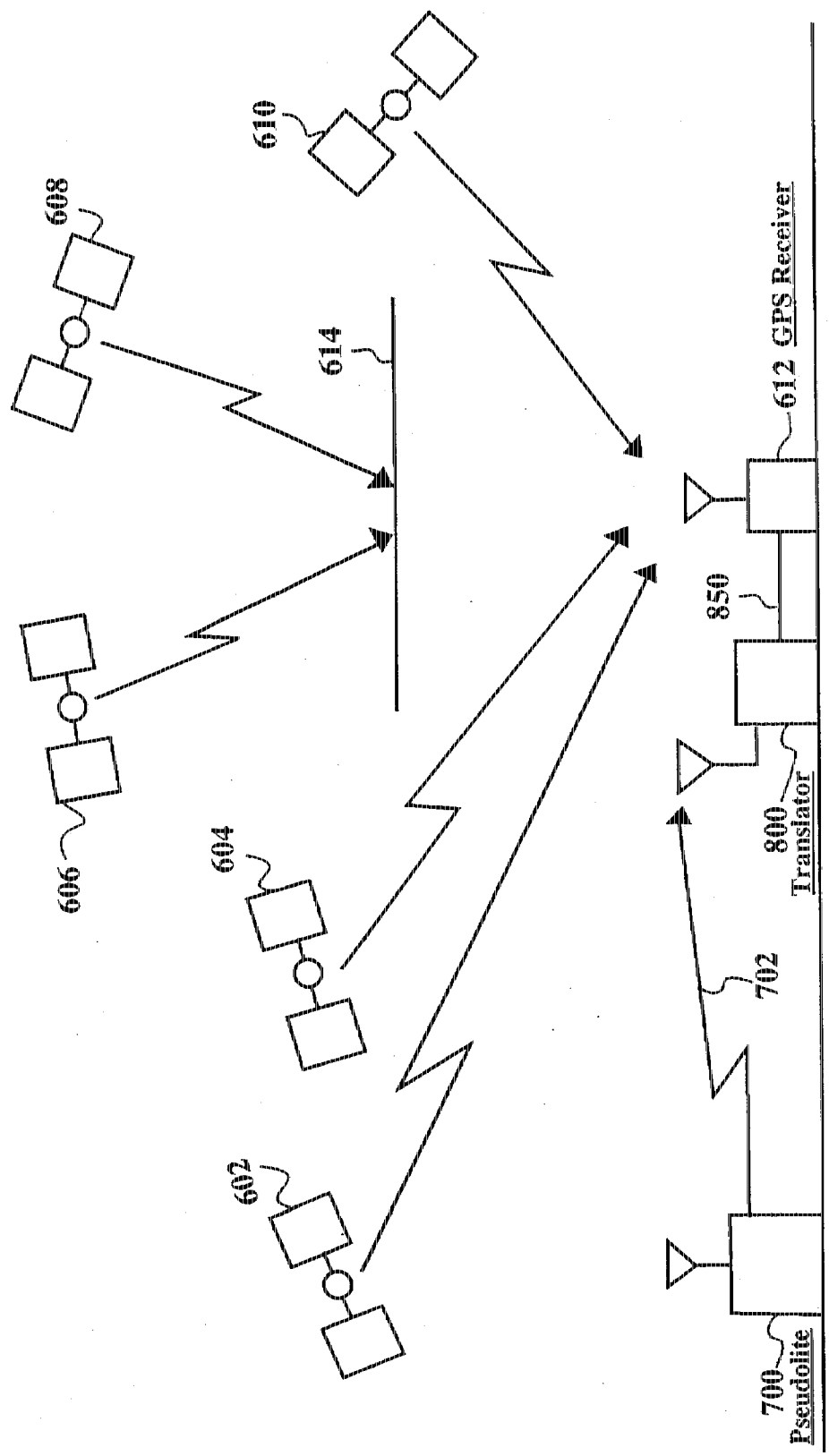
FIG. 8B is a schematic diagram illustrating the use of a translator in accordance with the present claimed invention.

Referring now to FIG. 8B, a schematic diagram illustrating the use of a translator 800 in accordance with the present claimed invention is shown. In the present embodiment, translator 800 is physically connected to GPS receiver 612 via a hardwire link 850. By hardwire connecting translator 800 to GPS receiver 612, the present embodiment prevents signals transmitted from translator 800 from obscuring or interfering with signals transmitted from the observable GPS satellites 602, 604, and 610. The present invention is well suited to having translator 800 hardwired connected to GPS receiver 612 such that the incoming signals do not adversely affect the circuitry of the GPS RF receiver 18 of FIG. 3. That is, the barwire connection to GPS RF receiver 612 is made after the circuitry of GPS RF receiver 18. However, the present embodiment is also well suited to having translator 800 hardwire connected directly to, for example, the antenna of GPS receiver 612.

Referring next to FIG. 9, a block diagram of translator 800 is shown. An antenna 902 coupled to a receiver 904 receives position information signals transmitted from a pseudolite such as pseudolite 700 of FIG. 7. In the present embodiment, the position information signals have a first frequency as described above. A frequency converting processor 905 then converts the position information signals of the first frequency to position information signals having a second frequency. In the present embodiment, frequency converting processor 905 includes an amplifier 906, a band pass filter 908, a mixer 910, a local oscillator 912, a band pass filter 914, and an amplifier 916. It will be understood that the present invention is also well suited to the use of various other components, combinations of components, or other methods for converting the position information of a first frequency to position information having a second frequency. As mentioned above, in the present embodiment, the second frequency is a frequency exempt from government licensing as described in detail above.

With reference still to FIG. 9, translator 800 further includes an output unit 918 for communicating the position information having the second frequency to GPS receiver 612 of FIGS. 6-8. In the present embodiment, output unit 918 is a transmitter for transmitting the position information having the second frequency to GPS receiver 612 over link 802 of FIG. 8. Although such an output unit is used in the present embodiment, the present invention is also well suited to the use of various other output units such as, for example, a hard wire link extending between translator 800 and GPS receiver 612. Although GPS satellites are cited in the present embodiment, the present invention is also well suited to use with other radio navigation systems such as for example, a long range navigation (LORAN) system.

Figure 10:
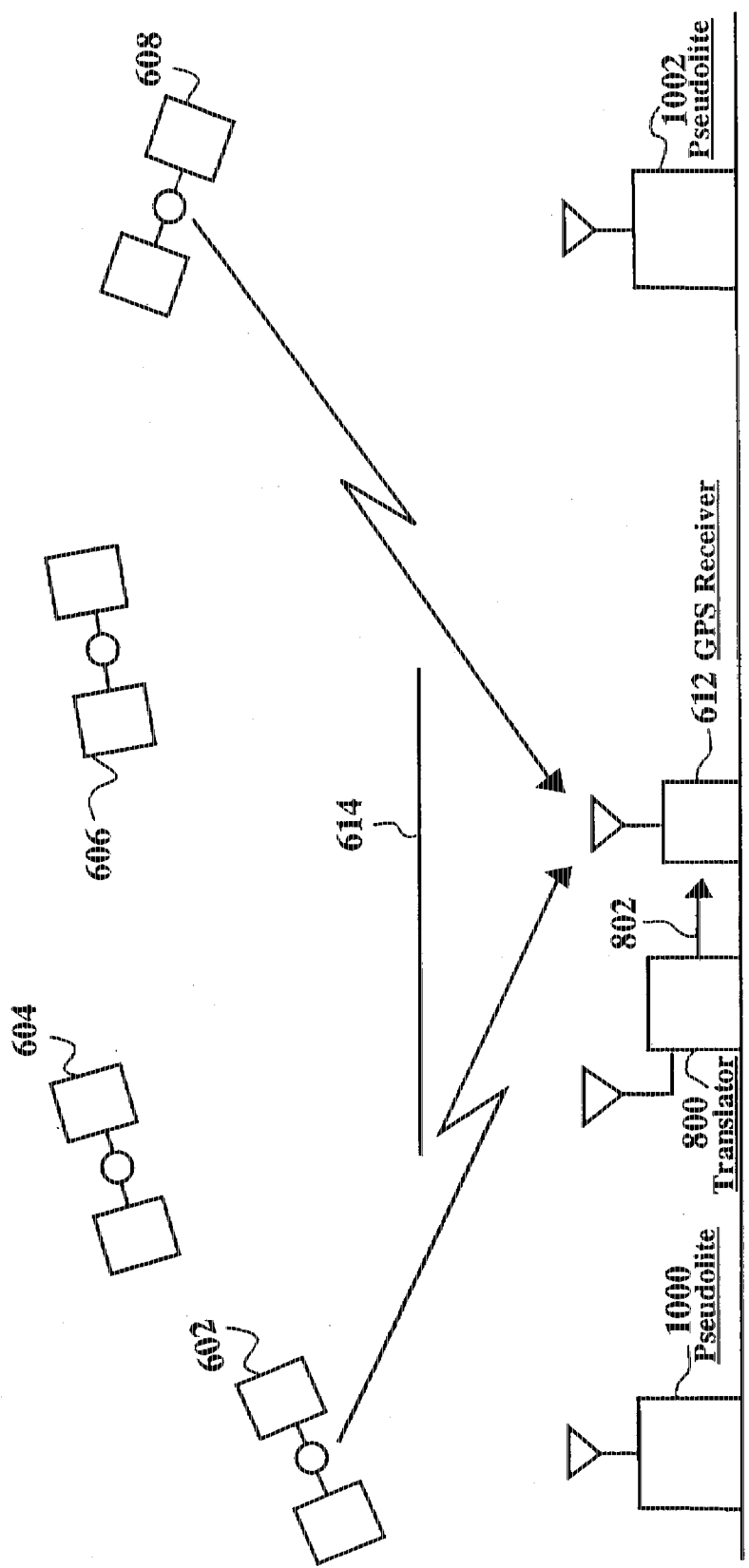
FIG. 10 is a schematic diagram illustrating the use of multiple pseudolites to compensate for an obstruction which interrupts a line of sight transmission path between a GPS receiver and GPS satellites.

With reference next to FIG. 10, another embodiment of the present invention is shown in which multiple pseudolites 1000 and 1002 communicate with GPS receiver 612 via translator 800. Such an embodiment is particularly useful when obstruction 614 prevents GPS receiver 612 from receiving signals transmitted from multiple GPS satellites. In the present embodiment, pseudolites 1000 and 1002 transmit position information having a first frequency to translator 800 in a manner as described above in detail. Translator 800 converts the position information to a second frequency and transmits the position information to GPS receiver 612 as described above. Thus, the present invention allows a conventional GPS receiver to be used in either a single or multiple pseudolite environment. Furthermore, the present invention provides a pseudolite system which does not require the user to modify or adapt a conventional GPS receiver.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A pseudolite translator comprising:
   a receiver adapted to receive position information having a first frequency, said position information transmitted from a pseudolite;
   a frequency converting processor for converting said position information having said first frequency to position information having a second frequency, said frequency converting processor coupled to said receiver; and
   an output unit coupled to said frequency converting processor, said output unit adapted to communicate said position information of said second frequency to a position determining device.

2. The pseudolite translator of claim 1 wherein said first frequency of said position information is an unlicensed frequency.

3. The pseudolite translator of claim 2 wherein said unlicensed first frequency of said position information is selected from the group of frequencies consisting of 902–928 MHz, 2400–2483.5 MHz, 5725–5875 MHz, and 24.0–24.5 GHz.

4. The pseudolite translator of claim 1 wherein said second frequency of said position information is 1575.42 MHz.

5. The pseudolite translator of claim 1 wherein said second frequency of said position information is 1227.6 MHz.

6. The pseudolite translator of claim 1 wherein said position determining device is a conventional GPS receiver.

7. A translator for communicating with a pseudolite, said translator comprising:
   a receiver adapted to receive position information from a pseudolite, said position information received from said pseudolite at a frequency selected from the group of frequencies consisting of 902–928 MHz, 2400–2483.5 MHz, 5725–5875 MHz, and 24.0–24.5 GHz;
   a frequency converting processor for converting said position information having said frequency selected from the group of frequencies consisting of 902–928 MHz, 2400–2483.5 MHz, 5725–5875 MHz, and 24.0–24.5 GHz, to position information having a frequency selected from the group of frequencies consisting of 1575.42 MHz and 1227.6 MHz, said frequency converting processor coupled to said receiver; and
   an output unit coupled to said frequency converting processor, said output unit adapted to communicate said position information of said frequency selected from the group of frequencies consisting of 1575.42 MHz and 1227.6 MHz to a conventional GPS receiver.

* * * * *